United States Patent [19]
Meyer-Wittreck et al.

[11] Patent Number: 6,016,958
[45] Date of Patent: Jan. 25, 2000

[54] UNIT FOR PROCESSING CHIP AND/OR MAGNETIC STRIPE CARDS

[75] Inventors: Udo Meyer-Wittreck, Rietberg; Hermann Ruebbelke, Delbrueck; Frank Krupke, Soest; Steffen Roebke; Reinhard Banse, both of Paderborn, all of Germany

[73] Assignee: ORGA Kartensysteme GmbH, Paderborn, Germany

[21] Appl. No.: 09/035,854

[22] Filed: Mar. 6, 1998

[30] Foreign Application Priority Data

Mar. 8, 1997 [DE] Germany .......................... 197 09 599

[51] Int. Cl.[7] ....................................................... G06F 7/08
[52] U.S. Cl. .......................... 235/381; 235/377; 235/475; 235/479; 235/480
[58] Field of Search ..................................... 235/381, 375, 235/376, 377, 380, 435, 439, 440, 449, 451, 452, 474, 475, 476, 477, 478, 480, 482, 493

[56] References Cited

U.S. PATENT DOCUMENTS

| | | | |
|---|---|---|---|
| 4,772,782 | 9/1988 | Nonat | 235/380 |
| 4,825,054 | 4/1989 | Rust et al. | 235/380 |
| 4,829,445 | 5/1989 | Burney | 235/376 X |
| 4,851,651 | 7/1989 | Gaucher | 235/380 |
| 4,866,259 | 9/1989 | Bonnemoy | 235/475 |
| 4,866,545 | 9/1989 | LaManna et al. | 235/437 X |
| 4,900,906 | 2/1990 | Pusic | 235/381 |
| 4,969,760 | 11/1990 | LaManna et al. | 400/134 |
| 5,010,239 | 4/1991 | Mita | 235/441 |
| 5,483,050 | 1/1996 | Fukasawa | 235/449 |
| 5,503,514 | 4/1996 | LaManna et al. | 414/753 |
| 5,814,796 | 9/1998 | Benson et al. | 235/375 |
| 5,837,991 | 11/1998 | LaManna et al. | 235/475 |
| 5,920,055 | 7/1999 | Roth et al. | 235/380 |

FOREIGN PATENT DOCUMENTS

| | | |
|---|---|---|
| 30 49 607 | 7/1982 | Germany . |
| WO 87/1232 | 2/1987 | WIPO . |
| 96/10798 | 4/1996 | WIPO . |

OTHER PUBLICATIONS

ORGA, Overview of personalisation systems. Missing month & year.

Elektronik Praxis, *Electronik Prascis,* No. 12, Jun. 1995, p. 108.

*Primary Examiner*—Michael G Lee
*Attorney, Agent, or Firm*—Foley & Lardner

[57] ABSTRACT

A unit for processing chip and/or magnetic stripe cards. The unit comprises a minimum of one card storage magazine to store cards to be processed, a minimum of one chip and/or magnetic stripe processing station to record data on the chip (semiconductor element) and/or the magnetic stripe of the card, and a minimum of one card body processing station to record visible, unmodifiable data on the card body. The unit further includes an optical identification station with an evaluation unit to verify accuracy and/or quality of the data recorded on the card body, with cards exhibiting incorrectly or defectively applied visible data being rejected as defective.

27 Claims, 8 Drawing Sheets

UNIT FOR PROCESSING CHIP AND/OR MAGNETIC STRIPE CARDS

BACKGROUND OF THE INVENTION

The invention relates to a unit for processing chip and/or magnetic stripe cards—a so-called card personalization unit. Such a unit on the one hand records card-/user-specific data on a chip (semiconductor element) and/or the magnetic stripe, and, on the other hand, it applies card-/user-specific data onto the card body. To this end, a unit of this type comprises a processing station for chips and/or magnetic stripes, into which processing facilities for chips and, if applicable, magnetic stripes are integrated in a well-known manner, and a processing station for the card body. Whereas the data recorded on the chip or the magnetic stripe may, as a general rule, be modified, because the corresponding filing media are overwritable, the data applied onto the card body cannot be modified. The unmodifiable data are applied onto the card body by means of, for example, laser inscribing, thermotransfer imprinting or embossing. The format of these cards is standardized by international standards (refer to ISO 7810).

A unit of this kind is described DE 30 49 607. In this unit, the cards, taken from a card magazine containing the cards to be processed, in succession first run through a chip and/or magnetic stripe processing station, where the modifiable data are recorded, and after that through the card body processing station, where the unmodifiable, visible data (alphanumeric characters, bar code, photograph, letterset embossing) are applied. In the course of this process, and following recording of the modifiable data on the chip and/or magnetic stripe and before applying the unmodified data, a verification for proper recording is performed. This verification may take place in the chip and/or magnetic stripe processing stations or in a separate verification station. Cards exhibiting inaccurate modifiable data recordings on the chip and/or magnetic stripe are not forwarded to the card body processing station, where the unmodifiable data are applied. These cards are rejected. In this unit however, cards, on which the unmodifiable data to be applied in the card body processing station were recorded incorrectly or with defects, are not rejected. The consequence of this is, that in automatic packaging processes of cards for shipment to customers or card distributors, cards with incorrectly or defectively applied data are shipped as well.

SUMMARY OF THE INVENTION

A unit for processing chip and/or magnetic stripe cards (K), comprising at least one card storage magazine for storage of cards to be processed; at least one processing station for chips and/or magnetic stripes, to record data on a chip and/or the magnetic stripe on the cards from the at least one storage magazine, with the accuracy of the data recorded there being verified and cards with incorrectly recorded data being rejected; at least one card body processing station to apply visible, unmodifiable data onto the card body; and an optical identification station with an evaluation unit to verify the accuracy and/or quality of the data applied onto the card body, with cards containing incorrectly or defectively applied visible data being rejected as defective.

In a further aspect of the present invention, the optical identification station includes an image evaluation device and structure to record the image of a card to be evaluated.

In yet a further aspect of the present invention, the optical identification station includes a minimum of one CCD-camera with an image evaluation device.

In yet a further aspect of the present invention, the optical identification station includes structure to have the card stand still during image recording.

In yet a further aspect of the invention, the optical identification station includes structure to have the card transported during image recording.

In yet a further aspect of the present invention, the optical identification station includes a device for conveying and positioning the cards to be checked, with a substantially unobstructed inspection window onto the card, with the conveying and positioning device comprising: a mounting frame held in a housing, with an entry slot, and an exit slot which is situated in alignment opposite to the entry slot; in the same direction as a card conveying direction, an entry centering device downstream of the entry slot and an exit centering device upstream of the exit slot, both of which serve to center cards on a card conveying plane (x,y), and where the unobstructed inspection window is installed between the entry centering device and the exit centering device; guide rollers for the cards disposed between the entry slot and the exit slot, running parallel to the card conveying direction, and arranged in a row side by side on pivoted bearings in the mounting frame, with the rotational axes for the guide rollers running vertical to the card conveying plane (x,y); and opposite to and distanced from the guide rollers, a conveyor belt stretching approximately along the length of the row of guide rollers, which belt revolves between a motor-driven driving roller and another driving roller, the rotational axes of which run vertical to the card conveying plane (x,y), so that for conveying and positioning, the cards (K) are held between the guide rollers and the conveyor belt by their two long edges and are maintained under a lateral pressure.

In yet a further aspect of the invention, the optical identification station includes a first camera, which is aimed onto a front of a card and a second camera, which is aimed to a back of the card.

The enclosed drawings contain a more detailed description of the unit as envisaged by the invention, as well as an illustration of its advantages.

DETAILED DESCRIPTION OF THE PREFERRED EMBODIMENT

Figure 1:
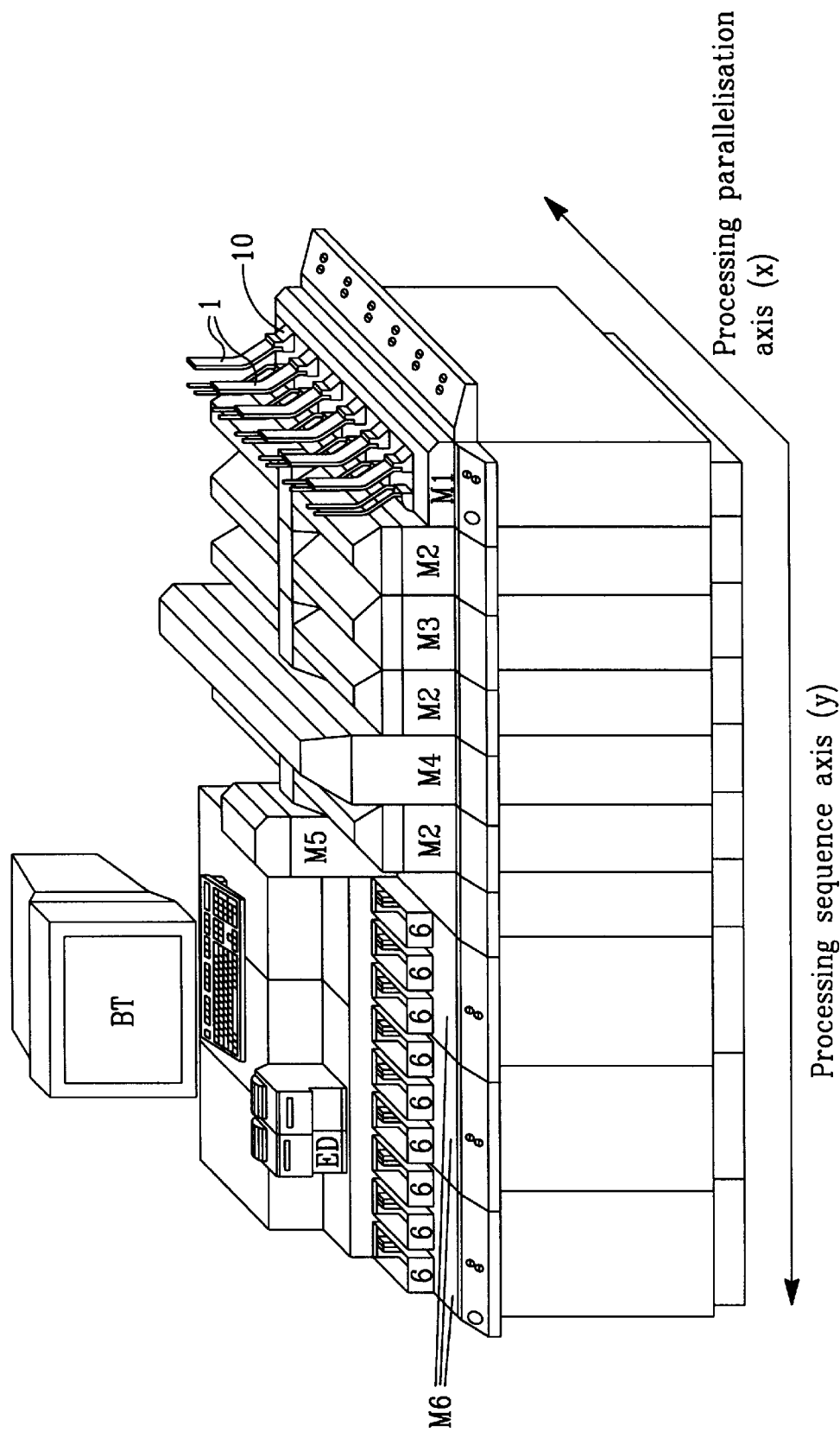
FIG. 1 is a perspective view of the unit of the present invention.
Figure 2:
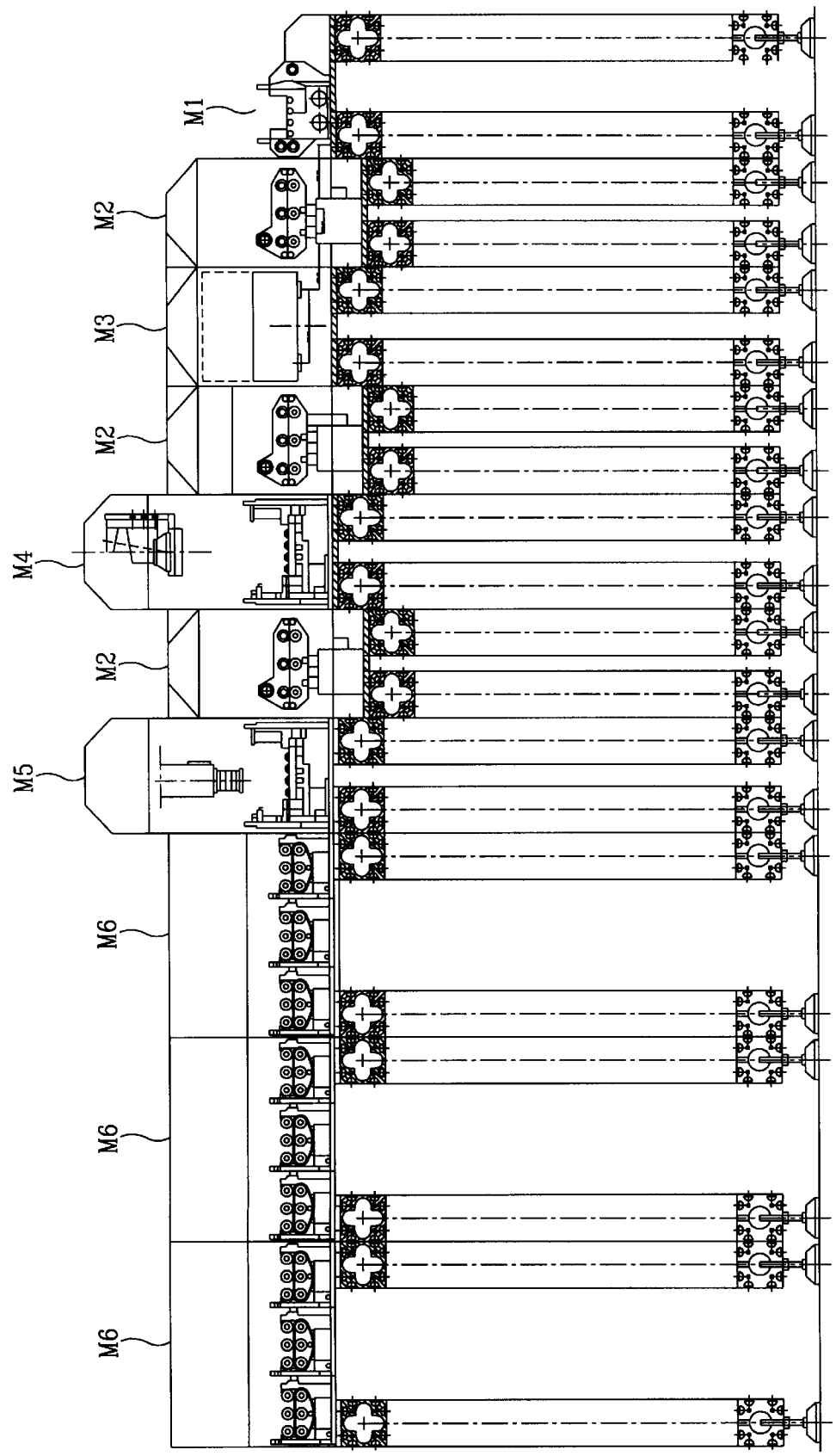
FIG. 2 is a side view of the unit of the present invention.
Figure 3:
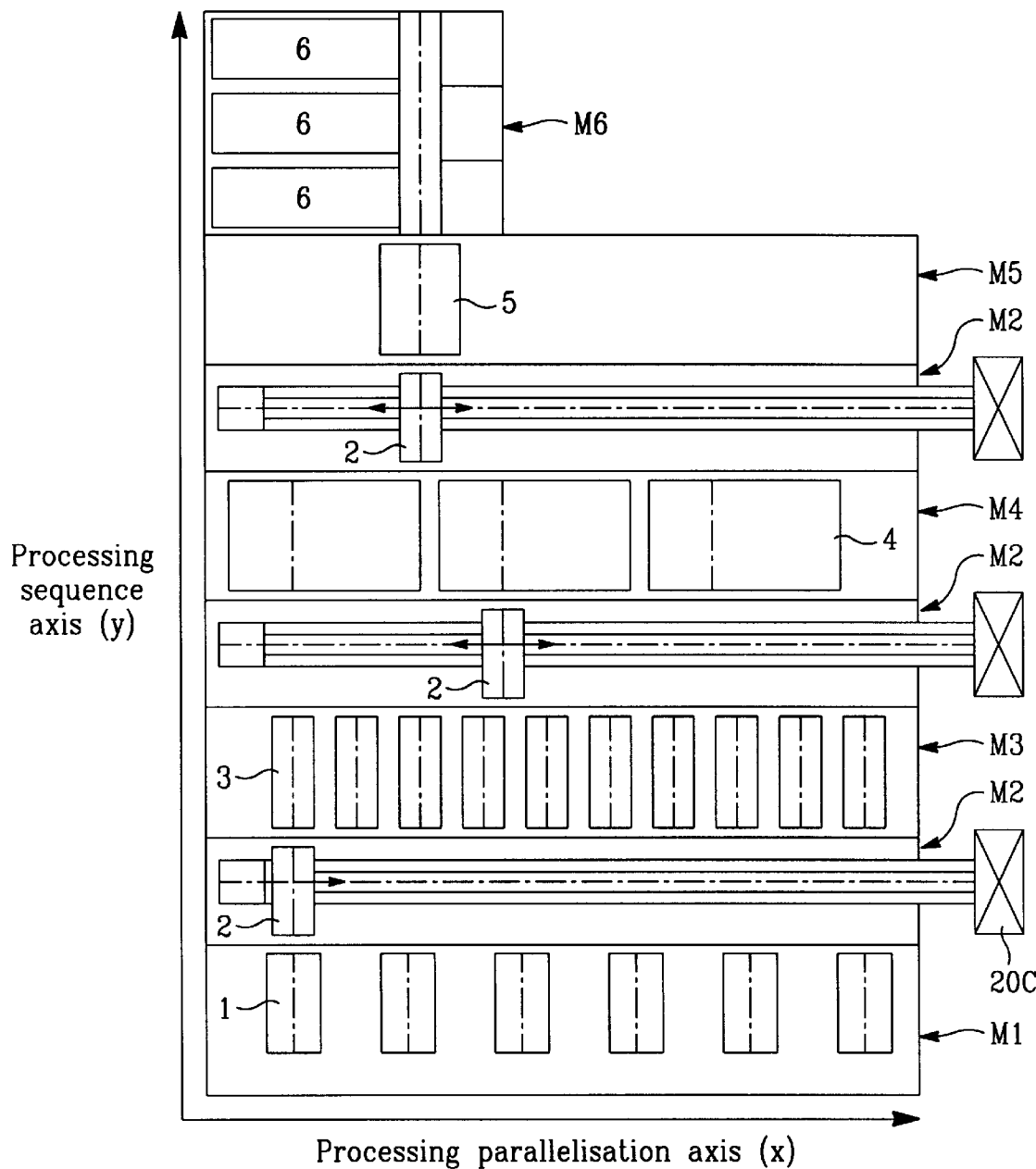
FIG. 3 is a schematic view of the unit components from above.
Figure 4:
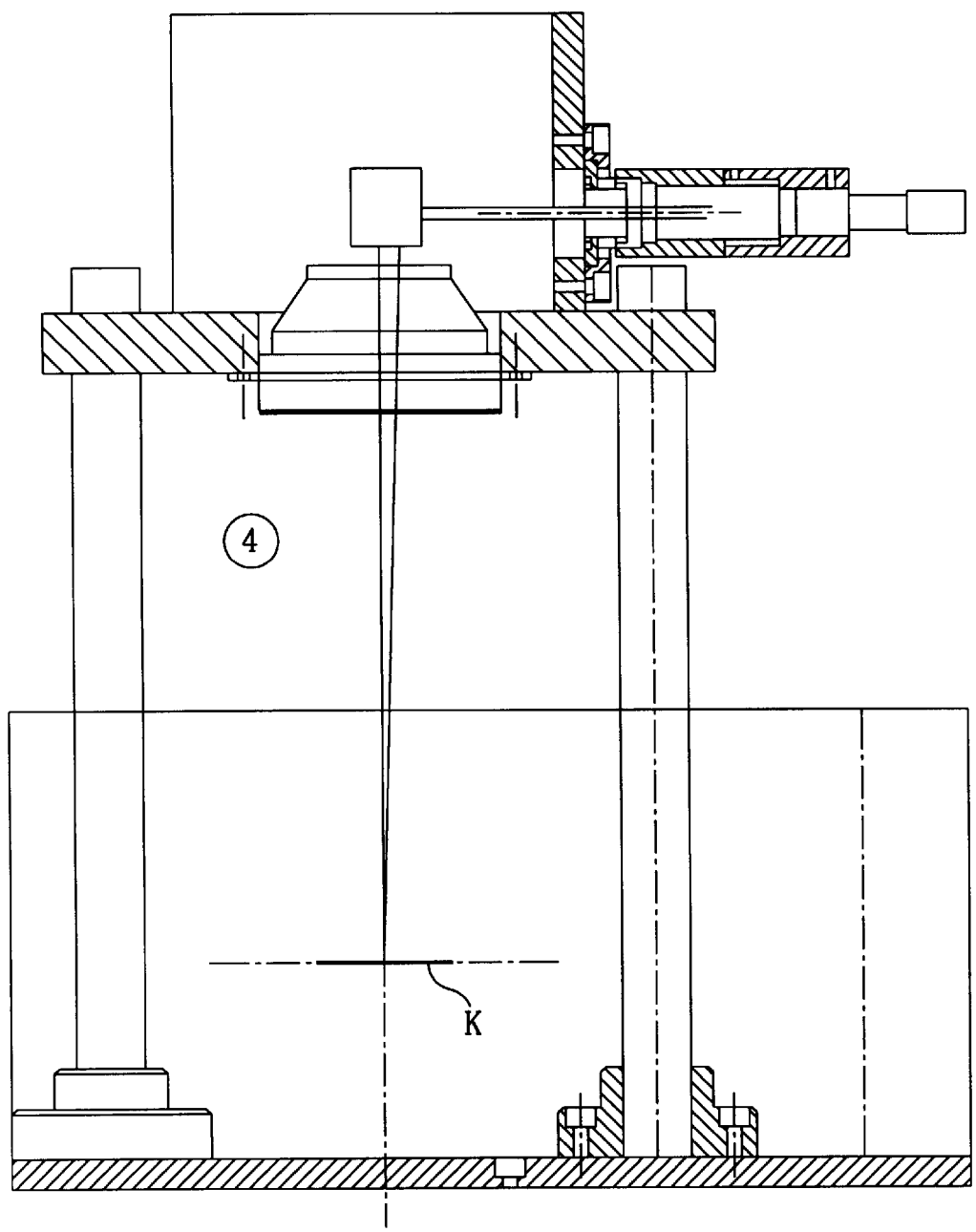
FIG. 4 is a schematic view of a laser inscribing station.

For better understanding of the unit of the present invention, a short description of the unit as a whole follows. FIG. 1, FIG. 2, and FIG. 3 illustrate the modular design of the unit. To achieve maximum card processing rates, the chip and/or magnetic stripe processing station (3) and the laser inscribing station (4) are implemented in multiples. As processing of chips and/or magnetic stripes requires considerably more time than the laser inscribing process, a higher number of chip and/or magnetic stripe processing units (3) is provided than laser inscribing stations (4). The processing stations implemented in multiples (3,4) are arranged in parallel along the processing parallelization axis (x) and structurally combined in one processing module each (M3, M4). Card storage magazines (1) are implemented in multiples as well, forming one card storage module (M1). Between the individual processing modules (M1, M3, M4), there is one card distribution module (M2) each, including a card distribution device (2), which conveys the cards to be processed from the card storage magazines (1) to the processing stations (3,4) and further on from there. Downstream of the laser inscribing module (M4) an image identification module (MS) is situated, which houses an optical identification station (5). Downstream of the image identification module (MS), a card deposit module (M6) is situated. This module includes three deposit magazines (6), one out of which may optionally be used for receiving cards rejected as defective.

According to the invention, the unit is equipped with an optical identification station (5), (FIGS. 3 and 5) including an evaluation unit, preferably a CCD-camera (50) with an image evaluation device (computer with image processing program) for verification of accuracy and/or quality of the data applied in a card body processing station (4). In the example unit layout shown here, the card body processing station (4) is designed as a laser inscribing station. The card-/user-specific data are laser-applied onto the card body in the form of alphanumeric characters, a bar code or a photograph. Data may be laser-applied to the front of the card only, to the back of the card only, or the front as well as the back of the card; or one part of the data may be laser-applied to the front of the card, and the remaining part to the back of the card. A picture of each card face (K1,K2) is taken with the aid of the camera (50) (FIG. 5) and subsequently evaluated by means of an image processing program installed on a computer. Alternatively, the image for comparison could be recorded electronically or optically. Evaluation includes character/design identification. Following this evaluation, a comparison between the laser-applied data and the set of data pertaining to the card concerned (K) is performed to check, whether the laser-applied data agree with the data contained in the data set. It is also possible to check, whether the data were laser-applied in the correct position on the card, and whether the size of the letters/figures as well as the "thickness of the bars" agrees with pre-set parameters. Other quality characteristics of the laser inscription, such as contrast or contour definition can be checked as well. Verification of data or logos, which were laser-applied onto the metal contact areas of the chip card (K) is possible as well.

Cards with incorrectly laser-applied data (e.g. wrong name, wrong card number, etc.) are rejected. Regarding other quality characteristics, for example, contrast or contour definition, rejection criteria with certain tolerance ranges may be defined. The unit as envisaged by the invention prevents cards containing data laser-applied in an improper manner (meaning e.g. of poor legibility) from being delivered to the customer. Optical identification is not limited to the verification of laser inscriptions. Data applied in thermotransfer or thermosublimation printing processes or by letterset embossing may likewise be checked. Color characteristics may also form part of the verification criteria.

Figure 5:
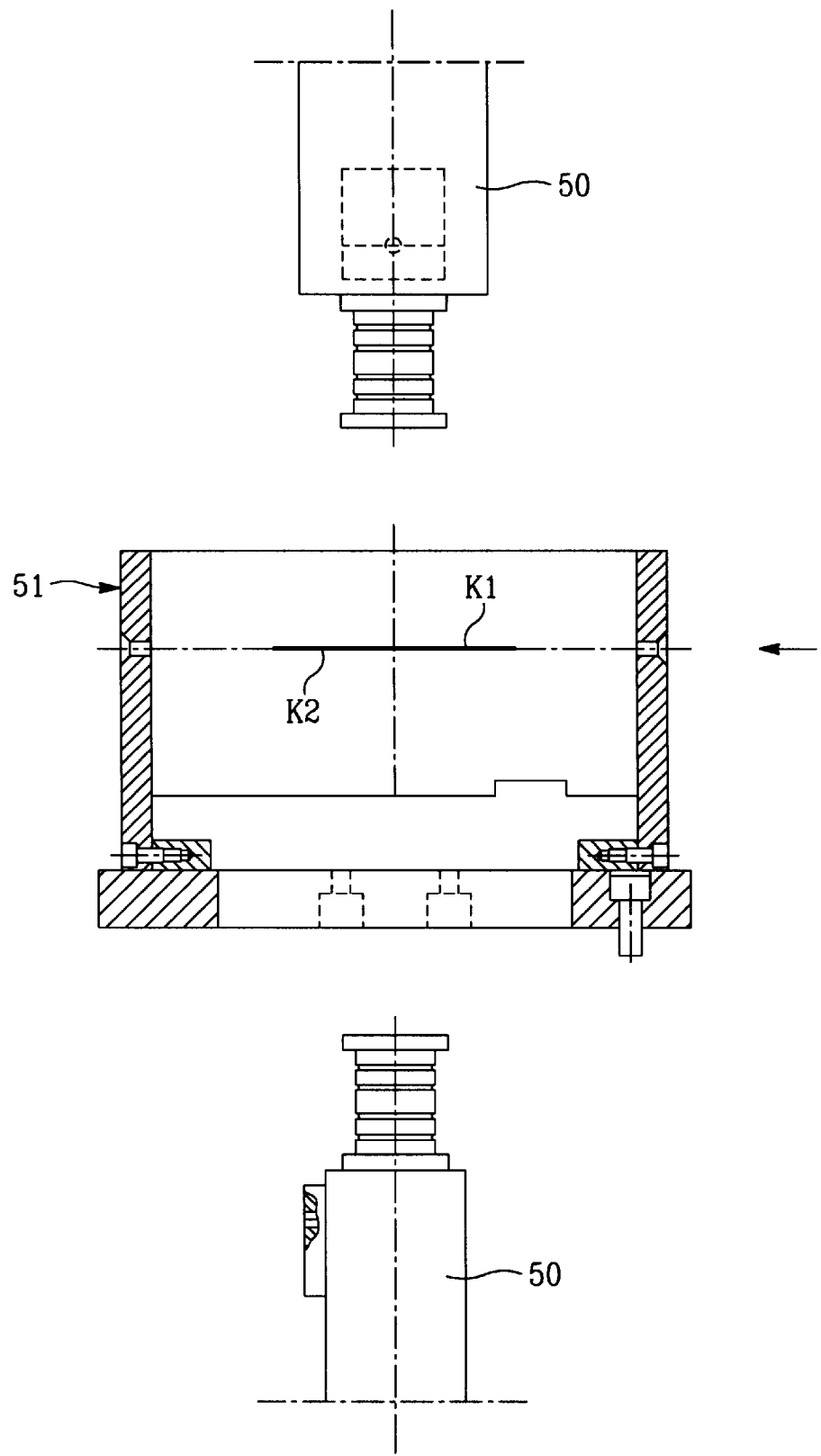
FIG. 5 is a schematic view of the optical identification station.

FIG. 5 shows a schematic view of the optical identification station (5). During image recording by the cameras (50), the card (K) is suspended in a special conveying and positioning device (51), which allows the cameras (50) a complete, unobstructed view of the front of the card (K1) and the back of the card (K2). During image recording, the card preferably stands still, to avoid distortions. However, when cameras (50) with short exposure periods as compared to card conveying rates are applied, it is also planned to continue transportation of the card during image recording, in order to save time.

Figure 6:
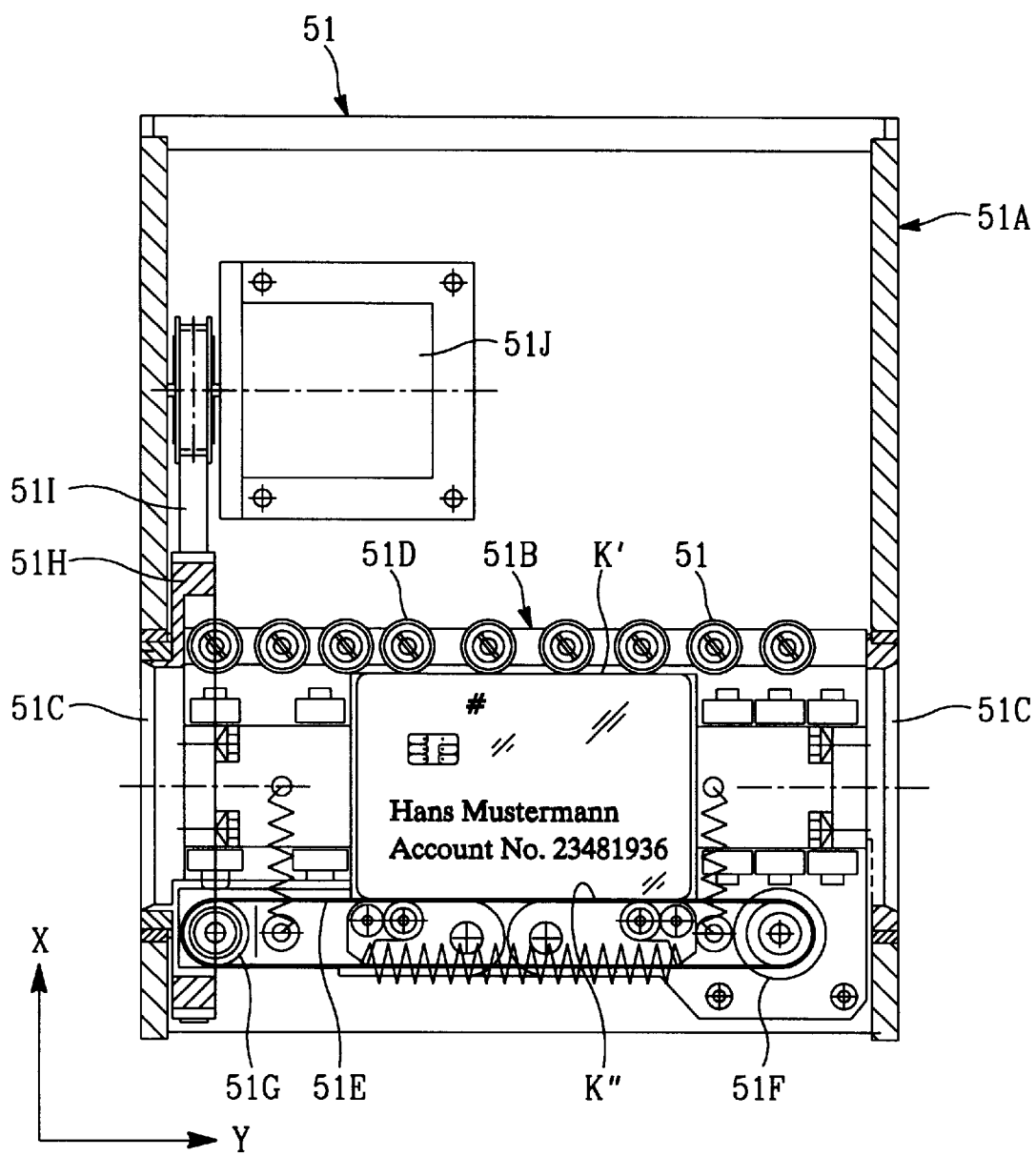
FIG. 6 is a top view of the card conveying and positioning device, which is part of the optical identification station.

FIG. 6 contains a top view of the conveying and positioning device (51), which allows positioning of the card during image recording in such a manner, that the view of the front and the back of the card is kept totally unobstructed. The conveying and positioning device (51) is equipped with a mounting frame (51B) held in a housing (51A), with an entry slot (51C) and an exit slot (51C*), which is situated in true alignment opposite to the entry slot. Downstream of the entry slot (51C), in the same direction as the card conveying/processing flow, an entry centering device (not shown) is situated, and an exit centering device (not shown) is situated upstream of the exit slot (51C*), both devices serving the purpose of centering the cards on a card conveying plane (x,y). The unobstructed inspection window is situated between the entry centering device and the exit centering device. Between entry slot (51C) and exit slot (51C*), parallel to the card conveying direction, guide rollers (51D) for the cards are arranged in a row side by side, running on pivoted bearings in the mounting frame (51B); with the rotational axes of the rollers running substantially vertical to the card conveying plane (x,y). Opposite to and distanced from the guide rollers (51D), a conveyor belt (51E) is situated at the mounting frame (51B), which stretches approximately over the length of the row of guide rollers (51D) and which revolves between a motor-driven driving roller (51F) and a driving roller (51G), the rotational axes of which run vertical to the card conveying plane (x,y). For conveying and positioning, cards (K) are held between the guide rollers (51D) and the conveyor belt (51E) by their two long edges (K',K") and are kept under a lateral pressure. Due to the fact, that the cards are only held by their edges, the view on the card faces is kept unobstructed—even in the marginal areas.

Figure 7:
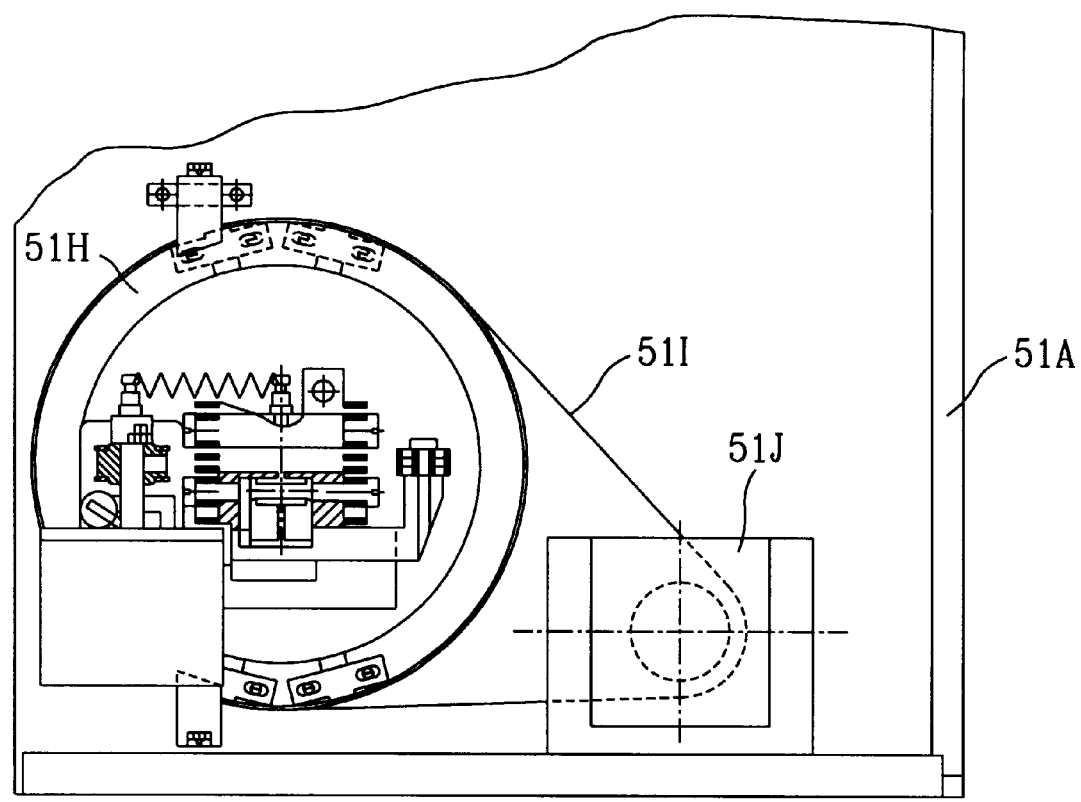
FIG. 7 is a lateral view of the card conveying and positioning device, which is part of the optical identification station, to illustrate the turn-around option.

In cases, where verification of front and back of the card is required, but only one camera (50) is to be used, a conveying and positioning device (51) shown in FIG. 7 of the type as described above is used, which allows turning of the card (K) by substantially 180°. For this purpose the mounting frame (51B) in the housing (51A) of the conveying and positioning device (51) is installed on a pivotable bearing the axis of which runs parallel to the direction of card transportation (y). A rotary disk (51H) is mounted coaxial to the mounting frame (51B), which is positively interlocking and/or nonpositively connected with a driving motor (51J) by means of a driving belt (51I).

Figure 8:
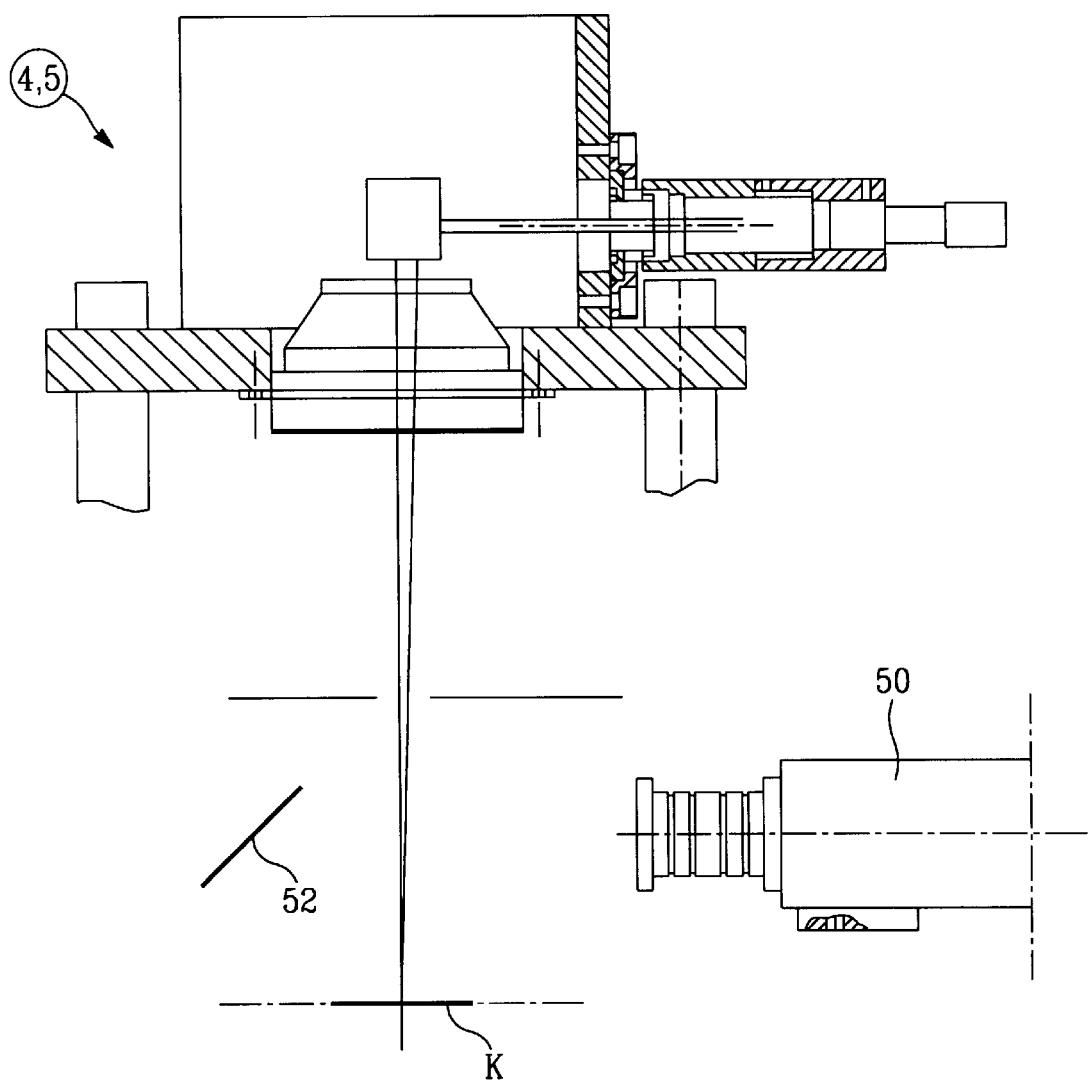
FIG. 8 is a schematic view of a laser inscribing station with integrated optical identification device.

FIG. 8 shows a laser inscribing station with integrated optical identification station. The sight of the camera (50) is guided indirectly via mirror (52) onto the card face to be inspected (K1), to prevent the camera (50) from blocking the path of the laser rays. An alternative possibility (not shown) to integrate laser inscription and optical identification is obtained by using the conveying and positioning device (51; with turning option) in the laser inscribing station (4). In this alternative version, the camera views the back of the cards being laser-inscribed. For verification, the card has to be turned.

If a bar-code is laser-applied onto the cards, the camera is preferably completed by a bar-code scanning unit.

The foregoing description of a preferred embodiment of the invention has been presented for purposes of illustration and description. It is not intended to be exhaustive or to limit the invention to the precise form disclosed, and modification and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed:

1. A unit for processing chip and/or magnetic stripe cards (K), comprising
    at least one card storage magazine for storage of cards to be processed;
    at least one processing station for chips and/or magnetic stripes, to record data on a chip and/or the magnetic stripe on the cards from said at least one storage magazine, with accuracy of the data recorded there being verified and cards with incorrectly recorded data being rejected;
    at least one card body processing station to apply visible, unmodifiable data onto the card body; and
    an optical identification station with an evaluation unit to verify accuracy and/or quality of the data applied onto the card body, with cards containing incorrectly or defectively applied visible data being rejected as defective; wherein
    the optical identification station includes a device for conveying and positioning the cards to be checked, with a substantially unobstructed inspection window onto the card, with the conveying and positioning device comprising:
        a mounting frame held in a housing, with an entry slot and an exit slot which is situated in alignment opposite to the entry slot;
        in the same direction as a card conveying direction, an entry centering device downstream of the entry slot and an exit centering device upstream of the exit slot, both of which serve to center cards on a card conveying plane (x,y), and where the unobstructed inspection window is installed between the entry centering device and the exist centering device;
        guide rollers for the cards disposed between the entry slot and the exit slot, running parallel to the card conveying direction, and arranged in a row side by side on pivoted bearings in the mounting frame, with the rotational axes for the guide rollers running substantially vertical to the card conveying plane (x,y); and
    opposite to and distanced from the guide rollers, a conveyor belt stretching approximately along the length of the row of guide rollers, which belt revolves between a motor-driven driving roller and another driving roller, the rotational axes of which run substantially vertical to the card conveying plane (x,y), so that for conveying and positioning, the cards (K) are held between the guide rollers and the conveyor belt by their two long edges and are maintained under a lateral pressure.

2. The unit according to claim 1, wherein said optical identification station includes an image evaluation device to record the image of a card to be evaluated.

3. The unit according to claim 2, wherein said optical identification station includes a minimum of one CCD-camera with an image evaluation device.

4. The unit according to claim 2, wherein said optical identification station operates to have the card stand still during image recording.

5. The unit according to claim 2, wherein said optical identification station operates to have the card transported during image recording.

6. The unit according to claim 1, wherein the optical identification station includes only one camera installed either above or beneath the conveying and positioning device, with the mounting frame of the conveying and positioning device including entry slot and exit slot, guide rollers and conveyor belt, swiveling within the housing by about 180° around an axis running parallel to the card conveying direction, in which device the card is turned over for inspection of its back.

7. The unit according to claim 1, wherein the optical identification station is installed downstream in the direction of the processing flow behind a last card body processing station.

8. Unit according to claim 1, wherein several card body processing stations of different types are included, and a different one of said optical identification stations is installed downstream in the direction of the process flow behind each of these several card body processing stations.

9. The unit according to claim 1, wherein the optical identification station is integrated into the card body processing station.

10. The unit according to claim 1, wherein the optical identification station includes a bar-code scanner.

11. The unit according to claim 1, wherein the optical identification station includes a device for conveying and positioning the cards to be checked by holding the cards between edges thereof under a lateral pressure.

12. The unit according to claim 11, wherein the device for conveying and positioning the cards to be checked holds the cards between long edges thereof.

13. A unit for processing chip and/or magnetic stripe cards (K), comprising
    at least one card storage magazine for storage of cards to be processed;
    at least one processing station for chips and/or magnetic stripes, to record data on a chip and/or the magnetic stride on the cards from said at least one storage magazine, with accuracy of the data recorded there being verified and cards with incorrectly recorded data being rejected;
    at least one card body processing station to apply visible, unmodifiable data onto the card body; and
    an optical identification station with an evaluation unit to verify accuracy and/or quality of the data applied onto the card body, with cards containing incorrectly or defectively applied visible data being rejected as defective;
    wherein said optical identification station includes a first camera, which is aimed onto a front of a card and a second camera, which is aimed to a back of the card.

14. The unit according to claim 13, wherein the optical identification station is installed downstream in the direction of the processing flow behind a last card body processing station.

15. A unit for processing chip and/or magnetic stripe cards (K), comprising
    at least one card storage magazine for storage of cards to be processed;

at least one processing station for chips and/or magnetic stripes, to record data on a chip and/or the magnetic stripe on the cards from said at least one storage magazine, with accuracy of the data recorded there being verified and cards with incorrectly recorded data being rejected;

at least one card body processing station to apply visible, unmodifiable data onto the card body; and an optical identification station with an evaluation unit to verify accuracy and/or quality of the data applied onto the card body, with cards containing incorrectly or defectively applied visible data being rejected as defective, wherein said optical identification station includes an image evaluation device to record the image of a card to be evaluated;

wherein said optical identification station operates to have the card stand still during image recording; and wherein said optical identification station includes a first camera, which is aimed onto a front of a card and a second camera, which is aimed to a back of the card.

16. A unit for processing chip and/or magnetic stripe cards (K), comprising at least one card Storage magazine for storage of cards to be processed;

at least one processing station for chips and/or magnetic stripes, to record data on a chip and/or the magnetic stripe on the cards from said at least one storage magazine, with accuracy of the data recorded there being verified and cards with incorrectly recorded data being rejected;

at least one card body processing station to apply visible, unmodifiable data onto the card body; and an optical identification station with an evaluation unit to verify accuracy and/or quality of the data applied onto the card body, with cards containing incorrectly or defectively applied visible data being rejected as defective;

wherein said optical identification station includes an image evaluation device to record the image of a card to be evaluated;

wherein said optical identification station operates to have the card transported during image recording;

wherein said optical identification station includes a first camera, which is aimed onto a front of a card and a second camera which is aimed to a back of the card.

17. A unit for processing chip and/or magnetic stripe cards (K), comprising at least one card storage magazine for storage of cards to be processed;

at least one processing station for chips and/or magnetic stripes, to record data on a chip and/or the magnetic stripe on the cards from said at least one storage magazine, with accuracy of the data recorded there being verified and cards with incorrectly recorded data being rejected;

at least one card body processing station to apply visible, unmodifiable data onto the card body; and an optical identification station with an evaluation unit to verify accuracy and/or quality of the data applied onto the card body, with cards containing incorrectly or defectively applied visible data being rejected as defective;

wherein the optical identification station is installed downstream in the direction of the processing flow behind a last card body processing station; and wherein said optical identification by said optical identification station is performed indirectly through a mirror.

18. The unit according to claim 17, wherein said optical identification station includes an image evaluation device to record the image of a card to be evaluated.

19. The unit according to claim 17, wherein said optical identification station operates to have the card stand still during image recording.

20. The unit according to claim 17, wherein said optical identification station operates to have the card transported during recording.

21. The unit according to claim 17, wherein the optical identification station is installed downstream in the direction of the processing flow behind a last card body processing station.

22. The unit according to claim 17, wherein several card body processing stations of different types are included, and a different one of said optical identification stations is installed downstream in the direction of the process flow behind each of these card body processing stations.

23. The unit according to claim 17, wherein the optical identification station is integrated into the card body processing station.

24. The unit according to claim 17, wherein the optical identification station includes a bar-code scanner.

25. The unit according to claim 17, wherein the optical identification station includes a device for conveying and positioning the cards to be checked by holding the cards between edges thereof under a lateral pressure.

26. The unit according to claim 17, wherein the device for conveying and positioning the cards to be checked holds the cards between long edges thereof.

27. The unit according to claim 17, wherein said optical identification station includes a minimum of one CCD-camera with an image evaluation device.

* * * * *